United States Patent [19]

Kanda

[11] Patent Number: 5,530,434
[45] Date of Patent: Jun. 25, 1996

[54] MATRIX SWITCHER APPARATUS FOR SELECTIVELY OUTPUTTING INFORMATION SIGNALS IN RESPONSE TO CONTROL SIGNALS IN THE FORM OF VARIOUS COMMUNICATION PROTOCOLS

[75] Inventor: Takeshi Kanda, Kanagawa, Japan

[73] Assignee: Sony Corporation, Tokyo, Japan

[21] Appl. No.: 428,511

[22] Filed: Apr. 25, 1995

Related U.S. Application Data

[63] Continuation of Ser. No. 65,317, May 21, 1993, abandoned.

[30] Foreign Application Priority Data

May 22, 1992 [JP] Japan .................................. 4-130992

[51] Int. Cl.⁶ ............................................. H03K 17/0412
[52] U.S. Cl. ................................ 340/825.04; 340/825.79; 340/825.8; 370/58.1; 370/58.2; 370/79
[58] Field of Search ......................... 340/825.79, 825.8, 340/825.04; 370/58.1, 58.2, 65.5, 79; 358/341, 343; 369/13, 14, 15

[56] References Cited

U.S. PATENT DOCUMENTS

| | | | |
|---|---|---|---|
| 4,885,569 | 12/1989 | Lellouche | 340/825.04 X |
| 5,125,089 | 6/1992 | McCambridge | 370/58.1 |
| 5,210,785 | 5/1993 | Sato et al. | 379/58.1 |
| 5,239,542 | 8/1993 | Breidenstein et al. | 370/58.2 |
| 5,276,445 | 1/1994 | Mita et al. | 340/825.8 |
| 5,307,342 | 4/1994 | Georgiou et al. | 370/58.2 X |
| 5,343,193 | 8/1994 | Shoda et al. | 340/825.79 |
| 5,420,856 | 5/1995 | Kerns | 370/58.1 |
| 5,463,619 | 10/1995 | Van Steenbrugge et al. | 370/58.1 |

FOREIGN PATENT DOCUMENTS

| | | |
|---|---|---|
| 56-102122 | 8/1981 | Japan . |
| 61-131627 | 6/1986 | Japan . |

*Primary Examiner*—Michael Horabik
*Assistant Examiner*—William H. Wilson, Jr.
*Attorney, Agent, or Firm*—Peter C. Toto; Jerry A. Miller

[57] ABSTRACT

A matrix switcher apparatus for selectively outputting information signals includes a first matrix switcher unit for selectively outputting an information signal according to control signals in the form of a first communication protocol, and a second matrix switcher unit for selectively outputting an information signal according to control signals in the form of a second communication protocol. The matrix switcher unit apparatus also includes a control unit having a plurality of remote control units each for generating control signals in the form of the first communication protocol in accordance with switching data input from an input unit, and a converting unit for converting control signals generated by the remote control units into control signals in the form of a second communication protocol.

12 Claims, 7 Drawing Sheets

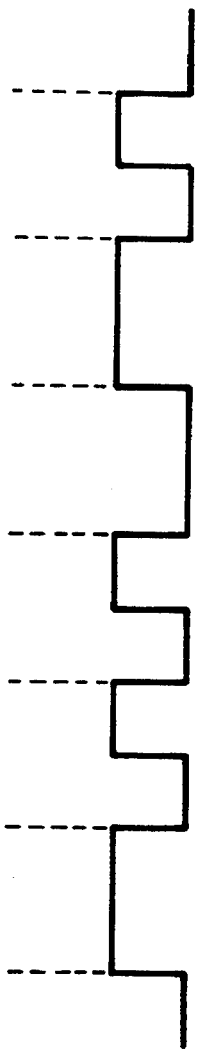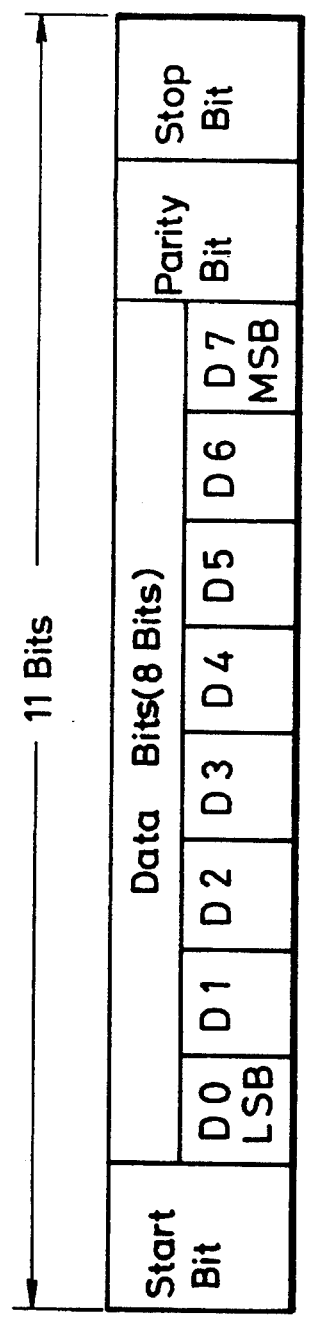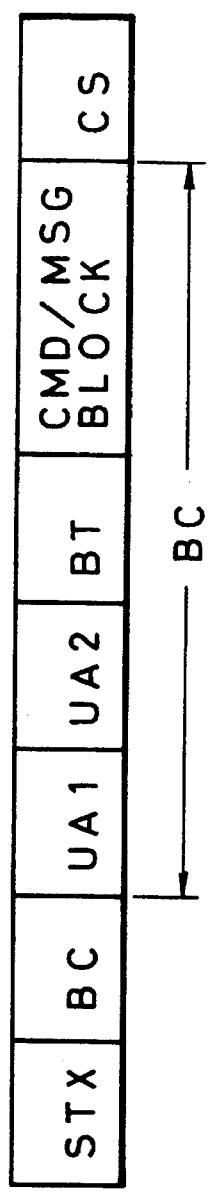
FIG. 3
FIG. 5
FIG. 6

| B3 B2 B1 B0 | CONTENTS OF COMMANDS |
|---|---|
| 0 0 0 0 | POLLING |
| 0 0 0 1 | CROSS POINT NUMBER |
| 0 0 1 0 | CROSS POINT NAME |
| 0 0 1 1 | DATA REQUEST BETWEEN THE PRIMARY AND SECONDARY STATIONS |
| 0 1 0 0 | DATA TRANSFER BETWEEN THE PRIMARY AND SECONDARY STATIONS |
| 0 1 0 1 | DATA REQUEST TO THE SECONDARY STATION THROUGH THE PRIMARY STATION |
| 0 1 1 0 | DATA TRANSFER TO THE SECONDARY STATION THROUGH THE PRIMARY STATION |
| 0 1 1 1 | REQUEST FOR RETRIEVAL OF WIRING INFORMATION (NAME) |
| 1 0 0 0 | REQUEST FOR RETRIEVAL OF WIRING INFORMATION (NUMBER) |
| 1 0 0 1 | EXECUTION RESULT OF SWITCHING OPERATION (NUMBER) |
| 1 0 1 0 | EXECUTION RESULT OF SWITCHING OPERATION (NAME) |
| 1 0 1 1 | REQUEST FOR SETTING TIME DATA |
| 1 1 0 0 | TERMINAL COMMAND |
| 1 1 0 1 | ACK (AFFIRMATIVE ACKNOWLEDGE) |
| 1 1 1 0 | NAK (NEGATIVE ACKNOWLEDGE) |
| 1 1 1 1 | RESET |

FIG. 8

| RECEIVING | RESPONDING | NAME |
|---|---|---|
| 05 | 04 • 05 | SYSTEM CONTROL MODE SETTING COMMAND |
| 20 | 04 • 05 | CROSS POINT SETTING COMMAND |
| 21 | 04 • 05 | MONITOR CROSS POINT SETTING COMMAND |
| 60 | 70 | RE-REPLY REQUEST COMMAND UPON ERROR |
| 61 | 71 | CROSS POINT SETTING STATE REQUEST COMMAND |
| 64 | 74 | STATE REQUEST COMMAND |
| 6A | 7A | SOFTWARE VERSION REQUEST COMMAND |

FIG. 9

MATRIX SWITCHER APPARATUS FOR SELECTIVELY OUTPUTTING INFORMATION SIGNALS IN RESPONSE TO CONTROL SIGNALS IN THE FORM OF VARIOUS COMMUNICATION PROTOCOLS

This is a continuation of application Ser. No. 08/065,317 filed on May 21, 1993, now abandoned.

FIELD OF THE INVENTION

The present invention generally relates to matrix switchers and, more particularly, to a matrix switcher apparatus for selectively outputting information signals in the form of various communication protocols.

BACKGROUND

In a broadcasting station, production studio or the like for preparing television broadcasting programs or video software, or the like, it is generally desirable to selectively choose video signals or audio signals to be fed to, or transmitted from, one of a plurality of devices such as a video tape recorder (VTR), video disc recording/reproducing apparatus, audio tape recorder, audio disc recording/reproducing apparatus, microphone or television camera, or the like.

For example, a matrix switcher apparatus having switches arranged in a matrix configuration is generally provided between some edit rooms and a VTR room in which a plurality of VTRs or various recording/reproducing apparatuses or the like are concentrically arranged. When the switches in the matrix switcher apparatus are arbitrarily changed to designate one of the edit rooms and a desired device, such as the VTRs arranged in the VTR room, the designated device and the designated edit room are connected through the matrix switcher apparatus.

The thus constituted matrix switcher apparatus differs in its required matrix scale depending on the number of devices being used and the number of the edit rooms or the like. Further, the matrix switcher apparatus sometimes deals with different types of input and output signals such as digital serial signals and analog signals, and further sometimes deals with more than ten channels of various signals. In these cases, since it is difficult to perform the switching operations of the system by one matrix switcher apparatus due to the number, and varying type of signal, there has been proposed that a plurality of matrix switcher units of small or intermediate scales each capable of dealing with signals of channels are provided to constitute a matrix switcher apparatus which can deal with a plurality of various types of signals.

An example of a conventional matrix switcher apparatus which is arranged to change over digital serial signals and analog signals will be explained with reference to FIG. 1. This matrix switcher apparatus is used in an electronic edit system so as to selectively change connection between VTRs (VTR1–VTR10) for reproduction in a VTR room and edit rooms 1–3 having VTRs (VTR11–VTR13) for recording, respectively.

Each of the VTRs (VTR1–VTR10) shown in FIG. 1 receives and outputs a digital serial signal, such as a video signal or an audio signal, and an analog signal, such as a video signal or an audio signal. Matrix switcher units MSU1 and MSU2 used in the apparatus are provided depending on respective signal types. Each of the edit rooms 1 and 2 deals with both the digital serial signal and the analog signal, whereas the edit room 3 deals with only the analog signal. Each of the VTRs (VTR1–VTR10) in each of the VTR rooms is shared by the VTRs (VTR11–VTR13) in the edit rooms 1 to 3.

The apparatus is arranged in a manner that if the edit room 1 selects a digital serial signal of the VTR1 through the matrix switcher unit MSU1 for a digital serial signal, for example, the edit room 1 also selects an analog signal of the VTR1 through the matrix switcher unit MSU2 for an analog signal. In contrast, the edit room 3 can select signals of the VTRs in the VTR room only through the matrix switcher unit MSU2.

With reference to the system shown in FIG. 1, it can be seen that in the general matrix switcher apparatus a remote control unit, or remote controller, is provided to selectively turn on and off each of the cross point switches so that a desired input or output signal path is selected. That is, a desired signal routing is accomplished by manipulating buttons or levers, or the like, provided on an operation or control panel of the remote controller. In the above-described matrix switcher apparatus having a plurality of matrix switcher units, such as MSU1 and MSU2, there is also a plurality of remote controllers such as RCD and RCA provided in correspondence to the matrix switcher units, respectively. In this case, protocols and transmission formats or the like are required to be suitably set in order to transmit control signals or the like between the matrix switcher units MSU1 and MSU2 and the remote controllers RCD and RCA, respectively.

From the standpoint of this requirement, S-BUS has been proposed as a transmission standard. Details of S-BUS will be described later. A matrix switcher apparatus in compliance with this standard includes a plurality of matrix switcher units each having a matrix switcher for selectively connecting input channels and output channels, a control circuit for turning on and off each switch of the matrix switcher, and a transmitter/receiver circuit for transmitting and receiving communication data, including data related to the control operation of the control circuit through an external serial bus line. The matrix switcher apparatus, in compliance with the S-BUS standard, further includes at least one remote control unit having a transmitter/receiver circuit and a control circuit for remotely controlling these matrix switcher units, so that the communication data is transmitted through the external serial bus lines between each of the transmitter/receiver circuits of the matrix switcher circuits and the transmitting/receiving circuit of the remote control unit. Each of the remote control units is constituted so as to be selectively set to be either a primary station or a secondary station. The remote control units are set in a manner that only one unit is set to be the primary station and the remaining units are set to be the secondary stations. The primary station sequentially polls, or scans all of the remote control units to request transmission of data, then stores communication data output from those remote control units having data to be transmitted. The stored communication data is then collectively transmitted. Each of the units receives only data associated with its own unit from among the communication data transmitted from the primary station.

At present, only some currently known matrix switcher apparatuses operate on the above-described transmission standard (S-BUS). In the matrix switcher apparatus described in FIG. 1, the matrix switcher unit MSU1 employs the above-described transmission standard for a digital serial signal, while the matrix switcher unit MSU2 employs different serial transmission standard for an analog signal.

Thus, the matrix switcher apparatus in FIG. 1 employs the remote controllers RCD and RCA for the respective transmission standards to thereby selectively change the matrix switcher units MSU1 and MSU2.

Accordingly, when a plurality of matrix switcher units are controlled through communication means in compliance with different transmission standards different remote control units are required to accommodate the different transmission standards. As a result, the operations of the apparatus is more complicated.

OBJECTS AND SUMMARY OF THE INVENTION

Therefore, it is an object of the present invention to provide an improved matrix switcher apparatus in which the aforementioned shortcomings and disadvantages can be eliminated.

More specifically, it is an object of the present invention to provide a matrix switcher apparatus having a pair of matrix switcher units which are switched according to control signals in the form of different communication protocols.

One aspect of the present invention, provides a matrix switcher apparatus for selectively outputting information signals, which includes a first matrix switcher unit for selectively outputting an information signal according to a first control signal which is in the form of a first communication protocol, a second matrix switcher unit for selectively outputting an information signal according to a second control signal which is in the form of a second communication protocol, a control unit for generating a first control signal according to switching data input from an input unit and, a converting unit for converting the first control signal generated by the control unit to a second control signal in the form of the second communication protocol.

Preferably, the converting unit has a memory device for storing protocol conversion data. Further, preferably, the memory device is a random access memory.

Another aspect of the present invention, provides a matrix switcher apparatus for selectively outputting information signals. The matrix switcher apparatus includes a digital matrix switcher unit for selectively outputting a digital information signal according to a first control signal which is in the form of a first communication protocol, an analog matrix switcher unit for selectively outputting an analog information signal according to a second control signal which is in the form of a second communication protocol, a control unit for generating the first control signal according to switching data input from an input unit, a memory device for storing conversion data representing a relation between the first communication protocol and the second communication protocol, and data representing a relation between cross point switches of the digital matrix switcher unit and cross point switches of the analog matrix switcher unit, and a converting unit for converting the first control signal generated by the control unit to a second control signal in the form of a second communication protocol according to the conversion data.

Preferably, the conversion data is stored in a memory device. Further, preferably, the first control signal and the second control signal are transmitted in the form of first serial communication form and second serial communication form, respectively.

A further aspect of the present invention provides for a matrix switcher apparatus having a first switcher unit for selectively outputting an information signal in response to a first control signal in the format of a first communication protocol; and a second matrix switcher unit for selectively outputting an information signal in response to a second control signal which is in the format of a second communication protocol. The matrix switcher apparatus also has an input means, such as, for example, a keypad or keyboard, for inputting switching data to a control means. There is also provided a control means for generating the first control signal in response to switching data which is input via the input means. Further, there is provided a converting means for converting the first control signal generated by the control means into the second control signal.

The preceding and other objects, features, and advantages of the present invention will become apparent from the following detailed description of an illustrative embodiment thereof when read in conjunction with the accompanying drawings.

BRIEF DESCRIPTION OF THE DRAWINGS

FIG. 3 shows a waveform diagram of a bi-phase space modulation signal;

FIG. 5 is a schematic diagram illustrating a code in compliance with RS-422A;

FIG. 6 is a schematic diagram illustrating a telegraphic message format in compliance with RS-422A;

FIG. 8 is a table illustrating the polling commands; and

FIG. 9 is a table illustrating the receiving commands and the responding commands.

DETAILED DESCRIPTION OF THE PREFERRED EMBODIMENT

A matrix switcher apparatus according to one embodiment of the present invention will now be described with reference to FIG. 2.

Figure 1:
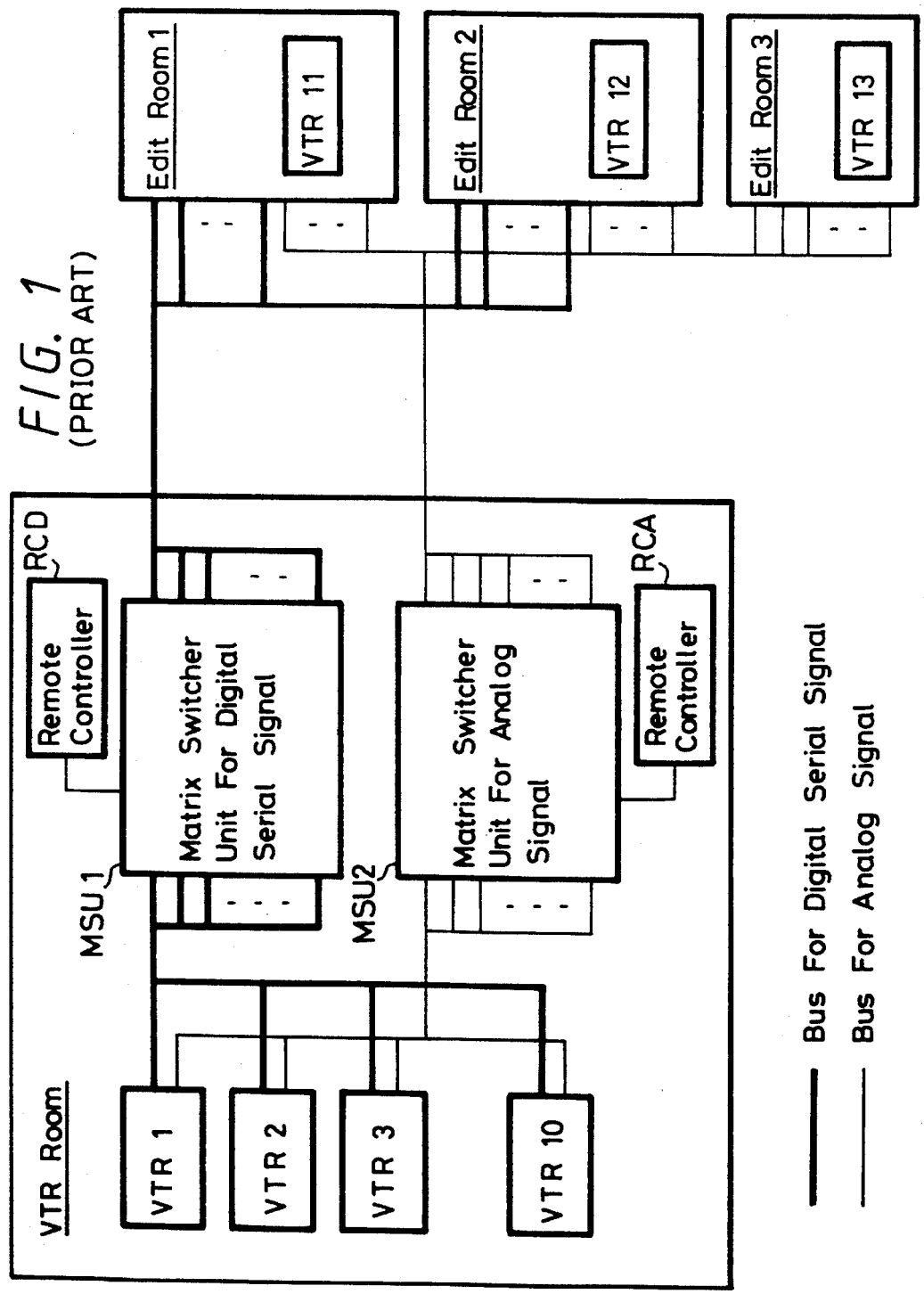
FIG. 1 shows in block form an example of a conventional matrix switcher apparatus.
Figure 2:
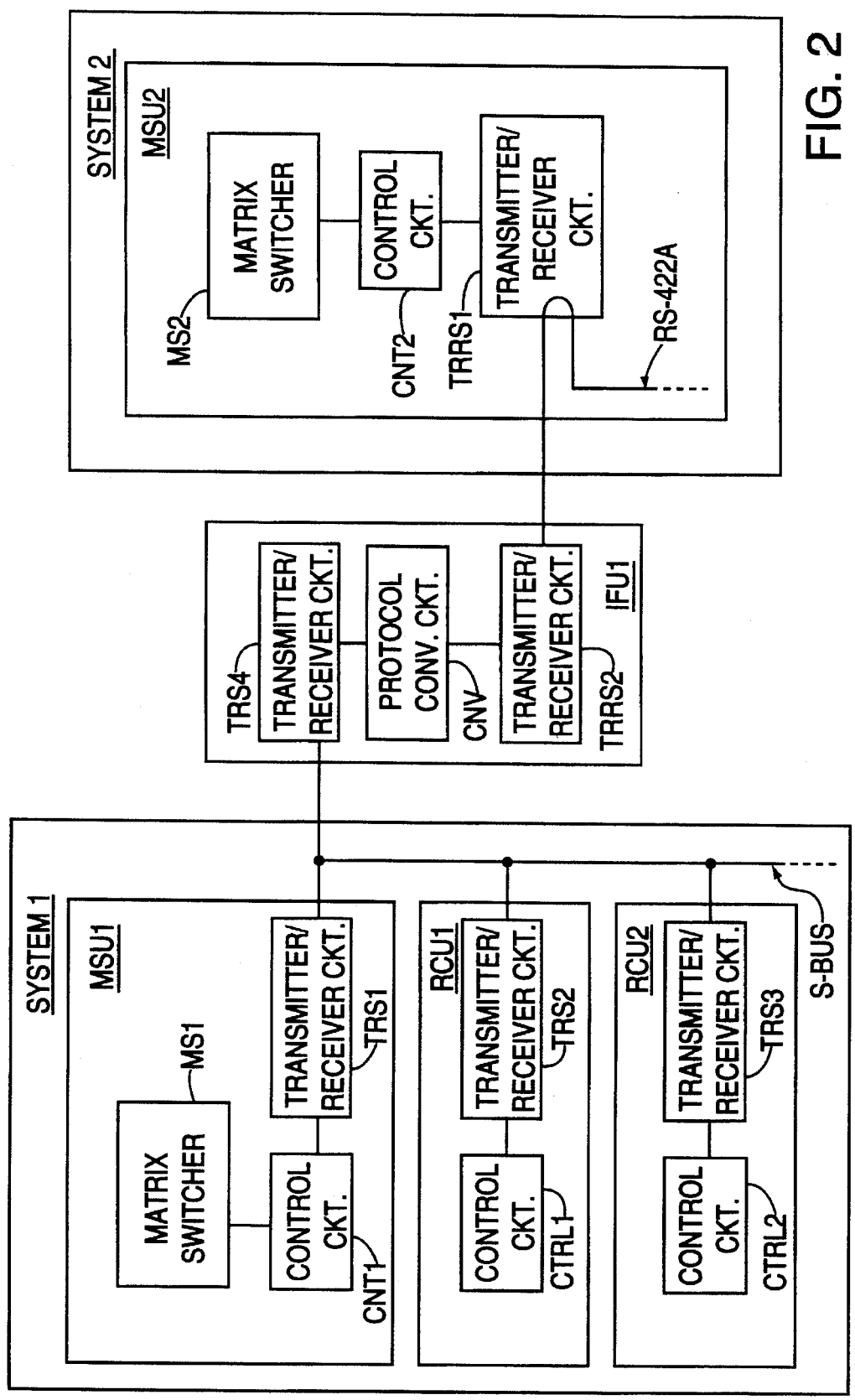
FIG. 2 shows in block form an arrangement of a matrix switcher apparatus according to one embodiment of the present invention.

Referring to FIG. 2, a matrix switcher unit MSU1 selectively switches digital serial signals such as video and audio signals. Like the matrix switcher apparatus in FIG. 1, the matrix switcher unit MSU1 of this embodiment includes a matrix switcher MS1 for selectively switching digital serial signals between the VTRs (VTR1–VTR10) in the VTR room and the edit rooms 1–3 each having one or more VTR, a control circuit CNT1 for turning on and off the switch at each cross point of the matrix switcher MS1, and a transmitter/receiver circuit TRS1 for receiving encoded control data transmitted in the form of a communication protocol in accordance with the S-BUS standard, and for supplying control data which is obtained by decoding received control data, to the control circuit CNT1. Details of the S-BUS standard will be described later.

A matrix switcher unit MSU2 selectively switches analog signals, such as video and audio signals. Like the matrix switcher apparatus in FIG. 1, the matrix switcher unit MSU2 of this embodiment includes a matrix switcher MS2 for selectively switching analog signals between the VTRs (VTR1–VTR10) in the VTR room and the edit rooms 1–3 each having one or more VTRs (VTR11–VTR13), a control circuit CNT2 for turning on and off the switch at each cross point of the matrix switcher MS2, and a transmitter/receiver circuit TRRS1 for receiving encoded control data transmitted in the form of a communication protocol which complies with the RS- 422A standard and for supplying control data which is obtained by decoding received control data, to the control circuit CNT2. Details of the RS-422A standard will be described later.

Remote control units RCU1 and RCU2 remotely control the on and off operations of the switches at each cross point of the matrix switcher unit MSU1 and the matrix switcher unit MSU2. Each of the remote control units RCU1 and RCU2 includes a control circuit CTRL1 or CTRL2 for generating a change-over control signal in response to the manipulation of control elements mounted on the remote control unit, and a transmitter/receiver circuit TR1 for encoding the change-over control signal to control data, in the form of a communication protocol which complies with the S-BUS standard, and transmitting the same. Each of these transmitter/receiver circuit TRS2 or TRS3 is connected to the transmitter/receiver circuit TRS1 of the matrix switcher unit MSU1 via a bus which complies with the S-BUS standard.

An interface unit IFU1 is connected to the bus of the matrix switcher unit MSU1. The interface unit IFU1 includes a transmitter/receiver circuit TRS4 for receiving control data transmitted from the remote control units RCU1 and RCU2. Control data is in the form of a communication protocol which complies with the S-BUS standard. A protocol converting circuit CNV for converting received control data which is in the form of a communication protocol which complies with the S-BUS standard into control data which is in the form of a communication protocol which complies with the RS-422A standard. The interface unit IFU1 also includes a transmitter/receiver circuit TRRS2 for transmitting control data converted in the form of a communication protocol which complies with the RS-422A standard to the matrix switcher unit MSU2.

In the embodiment of FIG. 2, a transmission system for control data which is in the form of communication protocol which complies with the S-BUS standard is called SYSTEM 1. A transmission system for control data which is in the form of communication protocol which complies with the RS-422A standard is called SYSTEM 2.

Referring to FIG. 2, SYSTEM 1 includes matrix switcher unit MSU1 for a digital serial signal having the matrix switcher MS1. The matrix switcher unit MSU1 includes: control circuit CNT1 for turning on and off the switch at cross points of the matrix switcher MS1, and transmitter/receiver circuit TRS1 for dividing data related to control operations of the control circuit CNT1 and matrix switcher MS1 into packets. Further, transmitter/receiver circuit TRS1 receives and transmits the packets as communication data via an external bus line which complies with the S-BUS standard.

SYSTEM 1 further includes two remote control units RCU1 and RCU2, each having a control circuit CTRL1 or CTRL2 and transmitter/receiver circuit TRS2 or TRS3. The transmitter/receiver circuit TRS2 or TRS3 is provided for receiving and transmitting communication data through an external bus line which complies with the S-BUS standard (the external S-Bus line). The control circuit CTRL1 or CTRL2, controls the input of information via operation or control buttons (operation elements) which are provided on a control panel or keypad of the remote control unit, and the output of display data to a display of the remote control unit, in accordance with data transmitted to or received from transmitter/receiver circuit TRS2 or TRS3.

The data transmission format and communication protocol associated with the S-BUS will now be described. A network in compliance with the S-BUS standard belongs to a local area network (LAN) which enables proper operations even under very low efficiency conditions such as, for example, a system having a data transmission length of 500 m or a data transmission rate of 307 Kbps. The network is a transmission path of a bus-like configuration which is formed by coaxial lines. The respective transmitter/receiver circuits of the matrix switcher unit and the remote control units are connected to the network as terminal devices. The transmission path is used by the terminal devices in a time division or sharing, manner. The modulation format in the network is a so-called biphase space modulation format, in which as shown in FIG. 3 a data level is inverted or data level transition occurs certainly at a boundary portion of adjacent two bit data and further a data level is inverted at a center portion of bit data of a level "0". An electrical signal voltage in the network is 2 V ± 0.5 V (terminating resistance value of 75Ω) and a 75Ω T type BNC connector is used and further an input impedance is set to be 57KΩ/27 kΩ.

Each of the transmitter/receiver circuits TRS2 or TRS3 of the remote control units RCU1 and RCU2 shown in FIG. 2 is classified into a primary station or a secondary station in view of data transmission. The primary station controls the data link and bears all the responsibility for error control and error recovery or the like at the link level. The secondary station executes the controls of the data link in response to a command from the primary station. Only one of all the units connected to the bus line in compliance with S-BUS is designated as the primary station and each of the remaining units is designated as the secondary station. The primary station sequentially designates the transmitter/receiver circuits TRS2 or TRS3 of all the units to request transmission of data, then stores therein communication data output from the designated unit having data to be transmitted, and then transmits the stored communication data at one time. Then, the transmitter/receiver circuit TRS2 or TRS3 of each of the units receives only data associated with its own unit among the communication data transmitted from the primary station. Thus, the primary station controls all data communication on the bus line in compliance with the S-BUS standard, so that the using efficiency of the bus line is improved. The primary station entirely organizes the communication data including information data such as switching requests from the remote control units RCU1 and RCU2 and a result of the switching from the matrix switcher unit MSU1 but does not directly control all the units.

In the SYSTEM 1, each of the matrix switcher unit MSU1 and the remote control units RCU1 and RCU2 is provided with a switch for selectively setting the unit to one of the primary station or the secondary station. When the switch is changed to select the primary station, the unit MSU1 or the remote control unit RCU1 or RCU2 (actually, the transmitter/receiver circuit TRS2 or TRS3 thereof) corresponding to the switch is set to the primary station. When the switch is changed to select the secondary station, the unit is set to the secondary station. All the units connected to the common S-BUS line are set in a manner that only one unit is set to the primary station and each of the remaining units is set to the secondary station.

Figure 4:
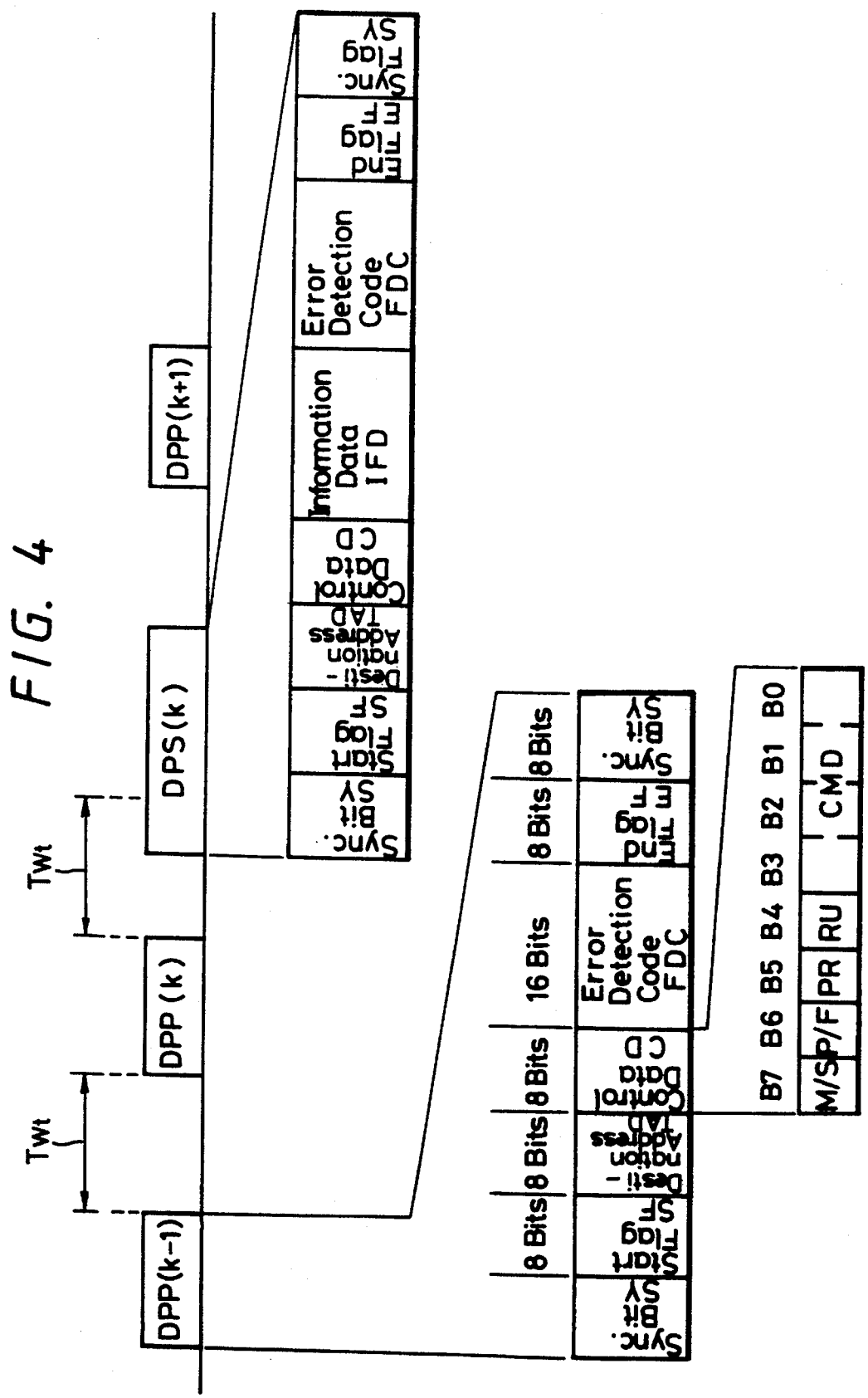
FIG. 4 is a schematic diagram illustrating data format in compliance with S-BUS.

FIG. 4 shows data format, as a concrete example of data transmitted on the bus line in compliance with S-BUS, in a case when the primary station performs a so-called polling operation where it queries in succession every unit to request data transmission and then the queried station sends data to be transmitted. All of the matrix switcher unit MSU1 and the remote control units RCU1 and RCU2 or the like are allocated with a series of addresses, that is, station addresses, respectively. As one example of the addresses, an address 1 is fixedly allotted to the primary station, and addresses following 2 are successively allotted to the secondary stations in a manner that there are no stations with the same address in one data link.

Only the station having an address corresponding to a destination address added to the communication data can fetch the communication data. As particular addresses, an address 0 is allotted as a no station address and the maximum address (an address 255 in a case of 8 bit address, for example) is allotted as a global address. The no station address is arranged so that none of the stations respond thereto and is used in a case of, for example, line testing of the bus line or the like. A global address is provided so that every station connected to the bus line can receive data.

FIG. 4 shows communication data packets DPPs in successive polling operations under the control of the primary station and a communication data packet DPS delivered from the secondary station in response to the polling operation. The data packet represents one unit block of data communication.

The polling operation is an operation in which every unit connected to the bus line is successively queried to request data transmission in a manner that the primary station designates a station address of one of the units connected to the bus line to request data transmission from the designated station and allocates the right of usage of the bus line to the designated station, then if there is no response from the designated station within a predetermined queue time Twt, the above station address is updated to thereby designate the next station address to be polled. The polling operation as to the primary station, is performed within the unit belonging to the primary station, and so the communication data packet DPP for the polling operation as to the primary station is not transmitted on the bus line. Referring to FIG. 4, the communication data packet DPP(k) represents a packet (block) in a case of performing the polling operation by designating an unit (the secondary station) with an address k. In the example shown in FIG. 4, the unit (the secondary station) with the address k has data to be transmitted and so the communication data packet DPS is outputted to the bus line from this unit within the queue time Twt.

The communication data packet DPP(k) for the polling operation is constituted, in sequence from the header portion thereof, by a bit string SY for synchronization, a start flag SF of 8 bits, a destination address TAD of 8 bits, control data CD of 8 bits, error detection codes FDC of 16 bits, an end flag EF of 8 bits and a bit string SY for synchronization. Each of the bit strings SY for synchronization at the header and last portions is in the range of 10 to 16 bits, for example. In contrast, configuration of each of the data communication packet DPS from the secondary station and a packet having information data is, in general, different from the communication data packet DPP in that information data IFD of N bits is added between the control data CD and the error detection codes FDC. The information data IFD of N bits may be constituted by various numbers of bytes, but all data between the start flag SF and the end flag EF of one packet (block) is limited to 256 bytes at maximum, for example. Thus, when the communication data packet having the successive information data exceeds this condition, the successive information data is divided into plural packets (plural blocks) upon transmission.

The control data CD has, for example, a primary station/secondary station discriminating bit M/S for discriminating whether the packet is originated from the primary station or the secondary station at the least significant bit position B7, and a data succession discriminating bit P/F for discriminating whether or not the communication data packet is the last block having the last divided portion of the successive information data. The data succession discriminating bit P/F is, in general, the next, or second least, significant bit position B6.

The primary station/secondary station discriminating bit M/S is set to be "1" or "0" when the communication data packet is transmitted from the primary station or the secondary station, respectively. The data succession discriminating bit P/F is set to be "1" or "0" when the communication data packet is an intermediate block having an intermediate divided portion of successive information data and the last block has the last divided portion of successive information data. The control data CD further has: a protection request discriminating bit PR at the third least significant bit position B5; a discriminating bit RU for discriminating whether or not the communication data packet is applied to the matrix switcher apparatus at the fourth least significant bit position B4; and, commands CMD at the remaining four bit positions B3 to B0 as shown in table 1.

With reference to FIG. 8, the polling command, which can be delivered only from the primary station, corresponds to the least significant 4 bits of the control data CD of the communication data packet DPP used in the polling operation. In response to this polling command, the secondary station designated by the destination address TAD of the same communication data packet, obtains a right of usage of the serial bus line. Then, the designated secondary station is required to respond within the queue time Twt, and if there is no response from the designated station within the queue time Twt, the primary station proceeds to the next polling operation. The commands of the cross point number and the cross point name designate a cross point number and a cross point name of the succeeding data, respectively. An amount of data being exchangeable upon data request or data transfer between the primary and secondary stations or to the secondary station through the first station is 8192 bytes, for example. Thus, in the case of transmitting NAK exceeding the above-described maximum value (for example, 256 bytes) in one packet, the NAK is divided in plural packets upon transmission. The data request and the data transfer between the secondary stations are performed through the primary station. The command CMD further includes the request command for retrieval of wiring information (name and number), the execution result command of switching operation (number and name), the request command for setting time data, the terminal command, the ACK (affirmative acknowledge) command, the NAK (negative acknowledge) command and the reset command. The operations and the transmitting method of the matrix switcher unit and the remote control units in the SYSTEM 1 has been described above.

The matrix switcher unit MSU2 in the SYSTEM 2 shown in FIG. 2 includes a matrix switcher MS2 for an analog signal, a control circuit CNT2 for turning on and off the switch at cross point of the matrix switcher MS2, and a transmitter/receiver circuit TRRS1 for dividing data related to the control operations of the control circuit CNT2 and various state data including states of the matrix switcher MS2 into packets and for receiving and transmitting the packets as communication data through the external bus line in compliance with RS-422A.

The data transmission format and communication protocol of the bus line in compliance with RS-422A will be described.

The communication using this bus line is in compliance with RS-422A which is electric characteristics of CCIT X 2.0 standard, that is, EIA "electric characteristics of balanced voltage digital interface circuit", in which effective operation is possible even in a start-stop system with a data rate of 38.4 Kbps, for example. The code used in the communication is constituted by 8 bits of binary code. As shown in FIG. 5, the code of one unit data of 8 bits, for example, is added with a start bit and a stop bit representing the start and end of the code, respectively.

The RS-422A telegraphic message format as shown in FIG. 6 includes, for example, a code STX representing the start of the telegraphic message, a unit address UA1, a unit address UA2, a command BT defining the format of the telegraphic message structure, a command CMD/MSG block used upon data reception and data response, a code BC defining the number of bytes from the unit address UA1 to the command CMD/MSG block, in this case 256 bytes at maximum, for example, and a command CS for confirming the end of the telegraphic message. The communication procedure is defined such that a responsive procedure or operation is performed when communication is started by a control device (a unit on a host side). In the embodiment shown in FIG. 2, the interface unit IFU1 corresponds to a host unit when viewed from the matrix switcher unit MSU2. The communication procedure is defined such that the responding procedure or operation must be started within 40 ms after the reception of a command from the host side, and that a series of data or characters constituting one telegraphic message must be transmitted successively within a period of less than 40 ms.

Referring to FIG. 2, since the matrix switcher unit MSU2 is connected in a multiple joint fashion, it has its own unit address UA1 and a unit address UA2 so as to be controlled by the control device (the unit on the host side). The unit address UA1 is basically fixed to "31H" (H: hexadecimal number), and the unit address UA2 is determined by setting a dip switch provided at each unit. The unit address UA2 is set in a manner that the dip switches are set in a bit map fashion and each dip switch has a unique meaning on a bit basis. When the control device (the unit on the host side) controls the respective units such as the matrix switcher unit MSU2 connected in a multiple joint fashion and so on, the control device sends a telegraphic message with a bit of the unit address UA2 corresponding to the matrix switcher unit to be controlled being set to "1".

When plural bits of the unit address UA2 are ON, the unit having received the telegraphic message with the unit address UA2 executes the commands but does not transmit a response to the message. In this case, if the NAK state occurs in which communication error such as, for example, a time out state occurs, the unit having received the message returns to the host side the NAK command representing that the normal communication has not been performed. After transmitting the NAK command, the unit having received the message ignores data transmitted from the host side for approximately 30 msec, for example. In contrast, if the unit receives a telegraphic message normally, the unit returns the ACK command to the host side. An example of commands is shown in FIG. 9.

The number of each of the receiving commands and the responding commands in FIG. 9 is represented by H (hexadecimal number). Referring to FIG. 9, the system control mode setting command sets a timing for changing over the matrix switchers. The cross point setting command selects a signal for outputting an arbitrary input signal to an arbitrary output terminal. The monitor cross point setting command selects a signal for selectively outputting to an output terminal for monitoring. The re-reply request command upon error is used for requesting a response is transmitted again when an error occurs during communication. The cross point setting state request command is used for checking the selection state of cross points of inputs and outputs of the matrix switcher of the unit controlled by the communication. The state request command is mainly used for detecting an error state of the unit having under control by the communication. The software version request command is used when investigating the software version of the unit under control by the communication. The communication control in the SYSTEM 2 is performed according to the above-described communication method and command format.

Referring to FIG. 2, the interface unit IFU1, for controlling the SYSTEM 2 and the control bus on the SYSTEM 1, in compliance with the S-BUS standard, performs the same operation as that of the secondary station of the control bus of the SYSTEM 1 and is added with a series of addresses, that is, a station address. The interface unit IFU1 operates as a host unit when viewed from the matrix switcher unit MSU2 of the SYSTEM 2. The interface unit IFU1 includes the transmitter/receiver circuit TRS4 for transmitting and receiving the control data through the external bus line in compliance with the S-BUS standard, the protocol converting circuit CNV for converting the control data received in compliance with the S-BUS standard, into data which in complies with the RS-422A standard, and the transmitter/receiver circuit TRRS2 for transmitting the converted control data through the external bus line in compliance with RS-422A.

Referring to FIG. 4, the primary station sends the communication data packet DPP for the polling operation to the control bus in compliance with S-BUS. In this case, the primary station/secondary station discriminating bit M/S of the control data of the communication data packet DPP is set to be "1", and in response to the polling command, only the secondary station designated by the destination address TAD of the same communication data packet fetches the packet.

Supposing that the communication data packet DPP(k) whose destination address TAD is k is sent out and that the interface unit IFU1 has the destination address k and serves as the secondary station and further has the information data to be communicated such as the switching request and the result of switching operation. In such a case, the interface unit IFU1 having the address k sends, in response to the data packet DPP(k), a communication data packet DPS(k) including the communication data to the control bus in compliance with the S-BUS standard within the queue time Twt after the termination of the transmission of the packet DPP(k). In general, the primary station/secondary station discriminating bit M/S of the control data of the communication data packet DPS transmitted from the secondary station is set to be "0", so that the data of the packet DPS is fetched only by the primary station and inhibited from being directly fetched by any of the secondary stations. The primary station stores the fetched data in memory, such as, for example, a random access memory (RAM) or the like and holds the stored data therein until the polling operations for all the secondary stations are accomplished. The primary station, when all of the series of polling operations are accomplished, sends the stored data as a packet to every secondary station. In this case, the primary station/secondary station discriminating bit M/S of the communication data packet is set to be "1" so that the secondary station designated by the destination address TAD thereof can fetch the data. The primary station, when all the stored data is sent, starts the polling operations for all the units again.

Figure 7:
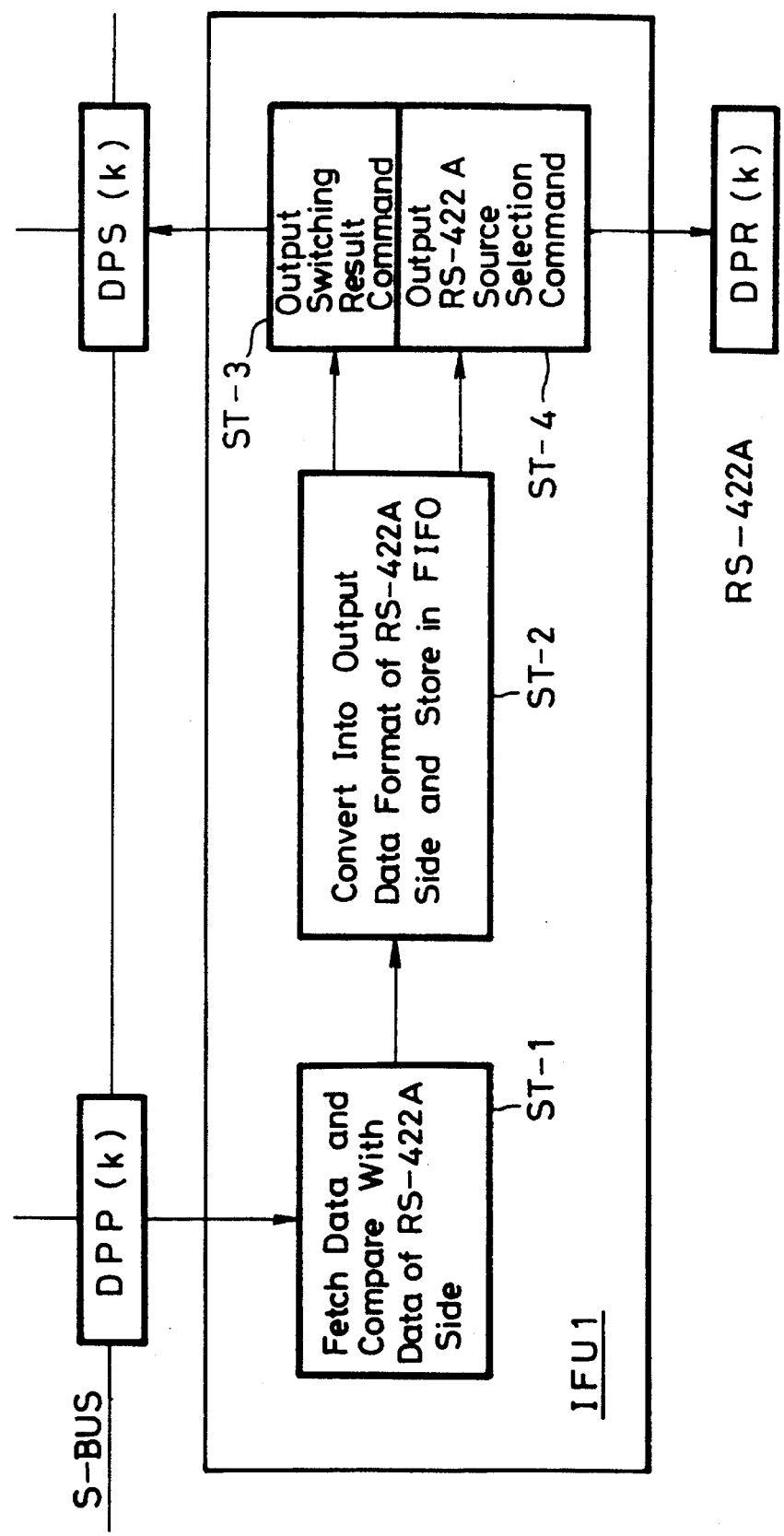
FIG. 7 is a schematic diagram illustrating the polling operation.

The polling operation performed in the interface unit IFU1 will be described with reference to FIG. 7. During the first polling operation, when the communication data packet DPP(k) including the information data is sent from the primary station to the interface unit IFU1 with an address k through the control bus in compliance with the S-BUS standard, data of the command CMD of the control data CD is compared with data of the cross point setting command of the cross points connected to the interface unit IFU1 through the bus line in compliance with RS-422A. As a result of the comparison, when there are data representing the coincident set cross points, the data are once stored in a first-in first-out (FIFO) memory as a data format of cross point setting command in the telegraphic message format communicated in compliance with RS-422A. Then the data are sent to the control bus in compliance with S-BUS as the communication data packet DPS(k), including the information data of execution result of switching operation. Further, a communication data packet DPR(k) is sent to each unit connected to the bus line in compliance with RS-422A so that each unit receives the cross point setting command and performs the cross point switching operation. The cross point setting command data for the cross points connected to the interface unit IFU1 is stored in the interface unit IFU1 by utilizing the terminal command for the control bus (in compliance with the S-BUS standard) and is set for every unit address of the respective units connected to the bus line in compliance with RS-422A. In this case, the number of cross points to be set is within 4095×4095, for example, and data of the cross point setting command can be stored in the interface unit IFU1 in a manner that each of the cross points of each unit connected to the bus line (RS-422A) is allotted with one of 4095×4095 cross points.

Therefore, according to the above-described embodiment, the interface unit IFU1 has the memory for storing protocol conversion data for converting the control data (in compliance with the S-BUS standard) into control data in compliance with RS-422A. Then it converts the control data in compliance with S-BUS into control data in compliance with RS-422A based on the stored protocol conversion data. Further, the memory holds data representing corresponding relation between the cross points of the matrix switcher unit MSU1 and the cross points of the matrix switcher unit MSU2 in a manner that the data are capable of being updated.

While the present invention has been described with reference to the embodiment in which the interface unit connects between the matrix switcher unit having the control bus in compliance with the S-BUS standard and the matrix switcher unit having the communication bus in compliance with the RS-422A standard, the present invention may be applied to a system in which the interface unit connects between matrix switcher units having a control bus other than those of the above-described embodiment. Further, the data format is not limited to that of FIG. 4 and the control data and the command or the like are also not limited to those described above.

As set out above, according to the present invention, in the matrix switcher apparatus having a pair of matrix switcher units which are switched according to control signals in the form of different communication protocols, respectively, in which control operations for performing the switching operation in each of the matrix switcher units can be performed easily.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A matrix switcher apparatus for selectively outputting video or audio signals comprising:

a first matrix switcher unit for selectively outputting an information signal in response to control signals in the form of a first communication protocol;

a second matrix switcher unit for selectively outputting an information signal in response to control signals in the form of a second communication protocol;

control means for receiving switching data from an input device and for generating control signals according to the switching data, said control means including a plurality of remote control units each for generating control signals only in the form of said first communication protocol;

converting means for converting control signals generated in the form of said first communication protocol by said control means to control signals in the form of said second communication protocol; and means for providing unconverted control signals in the form of said first communication protocol to said first matrix switcher and for providing converted control signals in the form of said second communication protocol to said second matrix switcher.

2. A matrix switcher apparatus as claimed in claim 1, wherein said converting means includes memory means for storing protocol conversion data.

3. A matrix switcher apparatus as claimed in claim 2, wherein said memory means comprises a random access memory.

4. A matrix switcher apparatus for selectively outputting video or audio signals comprising:

a digital signal matrix switcher unit for selectively outputting a digital information signal in response to control signals in the form of a first communication protocol;

an analog signal matrix switcher unit for selectively outputting an analog information signal in response to control signals in the form of a second communication protocol;

control means for receiving switching data from an input device and for generating control signals according to the switching data, said control means including a plurality of remote control units each for generating control signals only in the form of said first communication protocol;

memory means for storing conversion data representing relation between said first communication protocol and said second communication protocol and a relation between cross point switches of said digital signal matrix switcher unit and cross point switches of said analog signal matrix switcher unit;

converting means for converting control signals generated in the form of said first communication protocol by said control means to said second control signal in the form of said second communication protocol according to said conversion data: and means for providing unconverted control signals in the form of said first communication protocol to said digital matrix switcher and for providing converted control signals in the form of said analog communication protocol to said second matrix switcher.

5. A matrix switcher apparatus as claimed in claim 4, wherein said memory means renewably memorizes said conversion data.

6. A matrix switcher apparatus as claimed in claim 4, wherein control signals in the form of said first communication protocol and control signals in the form of said second communication protocol are transmitted in the form of first serial communication form and second serial communication form, respectively.

7. A matrix switcher apparatus for selectively outputting video or audio signals comprising:

a first switcher unit for selectively outputting an information signal in response to control signals in the format of a first communication protocol;

a second switcher unit for selectively outputting an information signal in response to control signals in the format of a second communication protocol;

an input means for generating switching data;

a control means for receiving said switching data from said input means, said control means including a plurality of remote control units each for generating control signals only in the format of said first communication protocol;

converting means for converting control signals in the format of said first communication protocol into control signals in the format of said second communication protocol; and means for providing unconverted control signals in the form of said first communication protocol to said first switcher unit and for providing converted control signals in the form of said second communication protocol to said second switcher unit.

8. A matrix switcher apparatus according to claim 7 wherein said first communication protocol comprises a protocol which conforms to the S-BUS standard format.

9. A matrix switcher apparatus according to claim 7 wherein said second communication protocol comprises a protocol which conforms to the RS-422A standard format.

10. A matrix switcher apparatus for selectively outputting video or audio signals comprising:

a first switcher unit for selectively outputting an information signal in response to control signals in the format of a first communication protocol;

a second switcher unit for selectively outputting an information signal in response to control signals in the format of a second communication protocol;

an input means for generating switching data;

a control means for receiving said switching data from said input means, said control means including a plurality of remote control units each for generating control signals only in the format of said first communication protocol;

converting means comprising:

means for converting control signals generated in the format of said first communication protocol into control signals in the format of said second communication protocol in accordance with protocol conversion data; and memory means for storing protocol conversion data; and means for providing unconverted control signals in the form of said first communication protocol to said first switcher unit and for providing converted control signals in the form of said second communication protocol to said second switcher unit.

11. A matrix switcher apparatus according to claim 10 wherein said memory means further comprises a random access memory.

12. A matrix switcher apparatus for selectively outputting video or audio signals comprising:

a digital signal matrix switcher unit for selectively outputting a digital information signal in response to an S-BUS standard protocol format control signal, said digital signal matrix switcher further comprising a plurality of cross-point switches;

an analog signal matrix switcher unit for selectively outputting an analog information signal in response to an RS-422A standard protocol format control signal, said analog signal matrix switcher unit further comprising a plurality of crosspoint switches;

an input means for generating switching data;

a control means for receiving said switching data from said input means, said control means including a plurality of remote control units each for generating control signals only in the form of said S-BUS standard protocol;

memory means for storing protocol conversion data, said protocol conversion data comprising data representing a relation between the S-BUS standard protocol format and the RS-422A standard protocol format, and said protocol conversion data further comprising data representing a relation between cross point switches of said digital signal matrix switcher unit and cross point switches of said analog signal matrix switcher unit;

converting means for converting said S-BUS standard protocol format control signal into said RS-422A standard protocol format control signal in accordance with said protocol conversion data; and means for providing unconverted, S-BUS standard protocol control signals to said digital matrix switcher and for providing converted, RS-422A standard protocol format control signals to said analog matrix switcher.

\* \* \* \* \*